United States Patent
Park et al.

(10) Patent No.: US 10,606,747 B2
(45) Date of Patent: Mar. 31, 2020

(54) STORAGE DEVICE AND METHOD OF OPERATING THE SAME

(71) Applicant: SK hynix Inc., Gyeonggi-do (KR)

(72) Inventors: Byeong Gyu Park, Gyeonggi-do (KR); Seung Gu Ji, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 1 day.

(21) Appl. No.: 16/139,497

(22) Filed: Sep. 24, 2018

(65) Prior Publication Data
US 2019/0258568 A1 Aug. 22, 2019

(30) Foreign Application Priority Data
Feb. 21, 2018 (KR) .................. 10-2018-0020726

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/0608* (2013.01); *G06F 3/0652* (2013.01); *G06F 3/0659* (2013.01); *G06F 3/0679* (2013.01); *G06F 2212/7201* (2013.01)

(58) Field of Classification Search
None
See application file for complete search history.

(56) References Cited

U.S. PATENT DOCUMENTS 8,996,768 B2 3/2015 Cohen et al.
2015/0149741 A1 5/2015 Zhuo et al.

*Primary Examiner* — Kevin Verbrugge
(74) *Attorney, Agent, or Firm* — IP & T Group LLP

(57) ABSTRACT

Provided herein may be a storage device and a method of operating the same. A method of operating a memory controller Included in a storage device for processing an unmap request may include receiving an unmap request for requesting deletion of address mapping information for an unmap address from a host, storing the unmap address and prestored unmap-pattern data in a random access memory (RAM), and outputting the unmap-pattern data to the host in response to a read request for the unmap address being inputted.

11 Claims, 12 Drawing Sheets

| LBA | DATA | FLAG |
|---|---|---|
| LBA1 | Normal DATA1 | MAP |
| LBA3 | Normal DATA2 | MAP |
| LBA4 | Unmap DATA | UNMAP |
| LBA7 | Normal DATA3 | MAP |
| LBA0 | Normal DATA4 | MAP |
| LBA9 | Normal DATA5 | MAP |
| LBA6 | Normal DATA6 | MAP |
| LBA8 | Unmap DATA | UNMAP |
| ⋮ | ⋮ | ⋮ |
| | | |

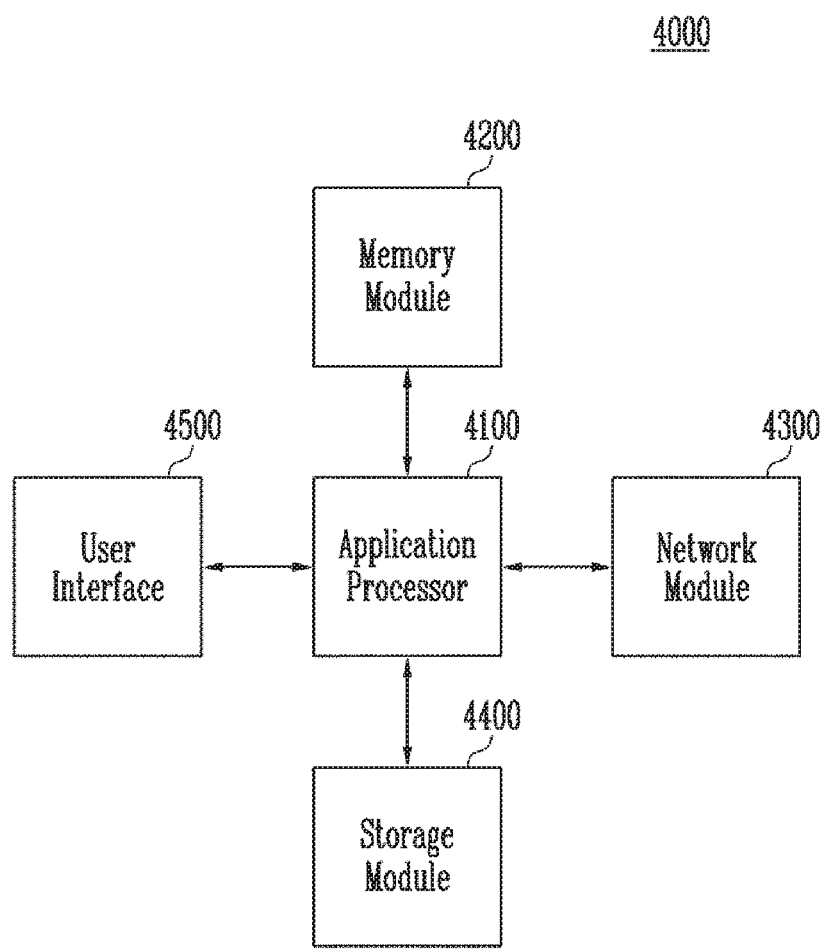

STORAGE DEVICE AND METHOD OF OPERATING THE SAME

CROSS-REFERENCE TO RELATED APPLICATION

The present application claims priority to Korean patent application number 10-2018-0020726, filed on Feb. 21, 2018, which is incorporated herein by reference in its entirety.

BACKGROUND

1. Field of Invention

Various embodiments of the present disclosure generally relate to an electronic device. Particularly, the embodiments relate to a storage device and a method of operating the storage device.

2. Description of Related Art

A storage device stores data under the control of a host device such as a computer, a smartphone, or a tablet. Examples of the storage device include a hard disk drive (HDD) which stores data in a magnetic disk, and a solid state drive (SSD) or a memory card which stores data in a semiconductor memory, particularly, a nonvolatile memory.

The storage device may include a memory device in which data is stored and a memory controller which controls the storage of data in the memory device. A memory device may be a volatile memory or a nonvolatile memory. Representative examples of a nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a storage device and a method of operating the storage device, which process an unmap request.

An embodiment of the present disclosure may provide for a method of operating a memory controller. The method may include receiving an unmap request for requesting deletion of address mapping information for an unmap address from a host, storing the unmap address and prestored unmap-pattern data in a random access memory (RAM), and outputting the unmap-pattern data to the host in response to a read request for the unmap address being inputted.

An embodiment of the present disclosure may provide for a method of operating a memory controller, the memory controller including a write cache buffer that individually stores write addresses in inputted write requests and unmap addresses in inputted unmap requests in an input order of the addresses. The method may include receiving a read request from a host, and outputting unmap-pattern data stored in the write cache buffer to the host when a logical block address in the read request is identical to any of the unmap addresses, wherein the unmap-pattern data is stored together with the unmap address in response to the unmap request.

An embodiment of the present disclosure may provide for a memory controller. The memory controller may include a write cache buffer configured to temporarily store a write address and write data that are included in a write request inputted from a host, and a controller configured to, in response to an unmap request for requesting deletion of address mapping information for an unmap address from the host, store the unmap address and prestored unmap-pattern data in the write cache buffer.

An embodiment of the present disclosure may provide for a memory controller. The memory controller may include a write cache buffer configured to individually store write addresses in write requests inputted from a host and unmap addresses in unmap requests inputted from the host in an input order of the addresses, and a controller configured to, in response to a read request for a logical block address that is an unmap address received from the host, output unmap-pattern data stored in the write cache buffer to the host, wherein the unmap-pattern data is data stored together with the unmap address in the write cache buffer in response to an unmap request being inputted.

An embodiment of the present disclosure may provide for a memory system. The memory system may include a memory device; a buffer configured to buffer a write address and write data corresponding to a write command, and an unmap address and unmap data corresponding to an unmap command; and a controller configured to:
control the memory device to store the buffered data according to the buffered address, generate logical-to-physical (L2P) address map information and physical-to-logical (P2L) address map information, and search, in response to a read command, the buffer and then the address map information for a read address to read data from one of the buffer and the memory device according to the read address; wherein the unmap data is predetermined and known to a provider of the read command.

BRIEF DESCRIPTION OF THE DRAWINGS

FIG. 16 is a block diagram illustrating a user system to which the storage device according to an embodiment of the present disclosure may be applied.

DETAILED DESCRIPTION

Figure 1:
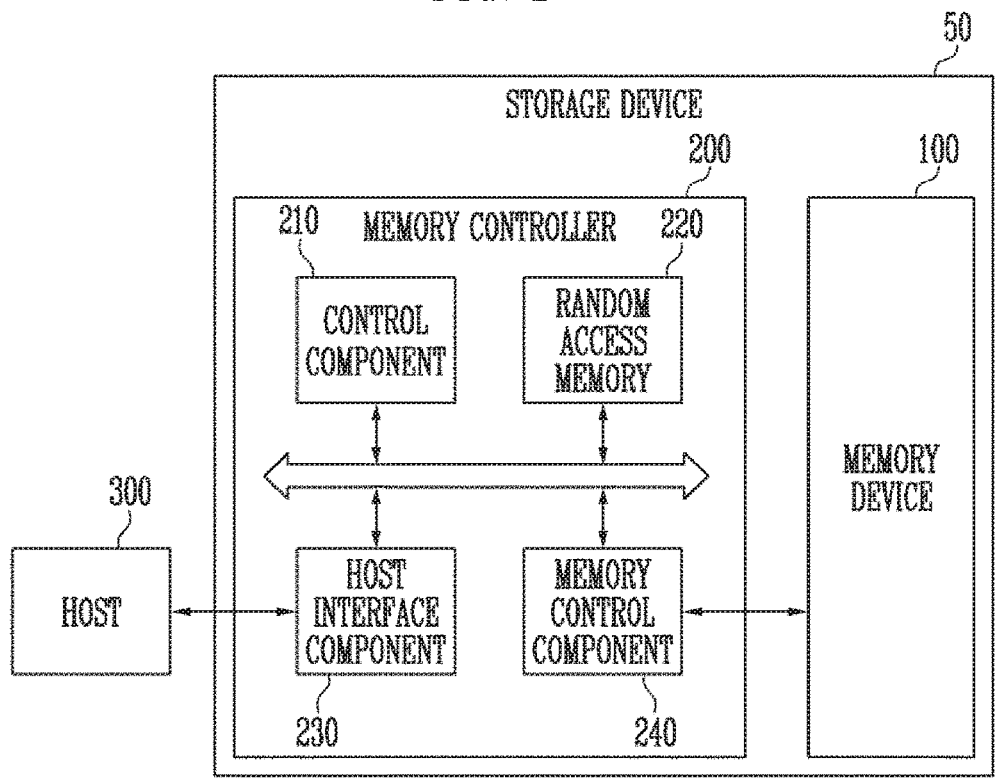
FIG. 1 is a block diagram illustrating a storage device according to an embodiment of the present disclosure.

Specific structural or functional descriptions provided in this specification are directed to the disclosed embodiments of the present disclosure. The present invention, however, is not limited to the disclosed embodiments.

Rather, aspects of the present invention may be configured or arranged differently than shown or described herein. Thus, the present invention should be construed as covering modifications, equivalents or alternatives that do not depart from the spirit and technical scope of the present disclosure. Also, throughout the specification, reference to "an embodiment" or the like is not necessarily to only one embodiment, and different references to "an embodiment" or the like are not necessarily to the same embodiment(s).

It will be understood that, although the terms "first" and/or "second" may be used herein to identify various elements, these elements should not be limited by these terms. These terms are only used to distinguish one element, from another element that otherwise have the same or similar names. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or one or more intervening elements may be present. In contrast, it should be understood that when an element is referred to as being "directly coupled" or "directly connected" to another element, there are no intervening elements present. Other expressions that explain the relationship between elements, such as "between" "directly between", "adjacent to" or directly adjacent to" should be construed in the same way.

The terminology used herein is for the purpose of describing particular embodiments and is not intended to be limiting. In the present disclosure, singular forms are intended to include plural forms and vice versa, unless the context clearly indicates otherwise. It will be further understood that the terms "comprise", "include", "have", and the like. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure pertains. It will be further understood that terms used herein should be interpreted as having a meaning that is consistent with their meaning in the context of this specification and the relevant art and not be interpreted in an idealized or overly formal sense unless expressly so defined herein.

Detailed description of functions and structures well known to those skilled in the art may be omitted to avoid obscuring the subject matter of the present disclosure. Unnecessary description is omitted to make the subject matter of the present disclosure clear.

Various embodiments of the present disclosure will now be described more fully with reference to the accompanying drawings, in which preferred embodiments of the present disclosure are Illustrated, so that those skilled in the art can easily carry out the present invention.

FIG. 1 is a block diagram illustrating a storage device according to an embodiment of the present disclosure.

Referring to FIG. 1, a storage device 50 may include a memory device 100 and a memory controller 200.

The storage device 50 may be a device, such as a mobile phone, a smartphone, an MP3 player, a laptop computer, a desktop computer, a game console, a TV, a tablet PC, or an in-vehicle infotainment system, which stores data under the control of a host 300.

The memory device 100 may store data. The memory device 100 is operated in response to the control of the memory controller 200. The memory device 100 may include a memory cell array including a plurality of memory cells which store data. The memory cell array may include a plurality of memory blocks. Each memory block may include a plurality of memory cells. A single memory block may include a plurality of pages. In an embodiment, each page may be a unit by which data is stored in the memory device 100 or by which data stored in the memory device 100 is read. A memory block may be a unit by which data is erased.

The memory device 100 may store data in the memory blocks either sequentially or randomly under the control of the memory controller 200. In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a Low Power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM).

In an embodiment, the memory device 100 may be implemented as a three-dimensional (3D) array structure. The present disclosure may be applied not only to a flash memory device in which a charge storage layer is formed of a conductive floating gate (FG), but also to a charge trap flash (CTF) memory device in which a charge storage layer is formed of an insulating layer.

The memory device 100 may receive a command and an address from the memory controller 200, and may access the area of the memory cell array selected by the address. That is, the memory device 100 performs an operation corresponding to the command on the area selected by the address. For example, the memory device 100 may perform a write operation (i.e., program operation), a read operation, and an erase operation. During a program operation, the memory device 100 may program data to the area selected by the address. During a read operation, the memory device 100 may read data from the area selected by the address.

During an erase operation, the memory device 100 may erase data stored in the area selected by the address.

The memory controller 200 may include a control component 210, a random access memory (RAM) 220, a host interface 230, and a memory control component 240.

The control component 210 may be implemented as a central processing unit (CPU), such as a microcontroller unit (MCU). The control component 210 may be implemented using a circuit, logic, code or combination thereof, and may control the overall operation of the storage device 50 including the control component 210. When power is applied to the storage device 50, the control component 210 may run firmware (FW). When the memory device 100 is a flash memory device, the control component 210 may run firmware such as a Flash Translation Layer (FTL) for controlling communication between the host 300 and the memory device 100.

The control component 210 may translate a logical block address (LBA) in a request receive from the host 300 into a physical block address (PBA). The logical block address (LBA) may be a sector address of the host 300. The physical block address (PBA) may be an address corresponding to a specific area of a memory cell array in the memory device 100.

The control component 210 may control the memory device 100 so that a program operation, a read operation or an erase operation is performed in response to a request received from the host 300. During the program operation, the memory controller 200 may provide the memory device 100 with a program command, a physical block address (PBA), and data. During the read operation, the memory controller 200 may provide the memory device 100 with a read command and a physical block address (PBA). During the erase operation, the memory controller 200 may provide the memory device 100 with an erase command and a physical block address (PBA).

In an embodiment, the control component 210 may autonomously generate a program command, an address, and data without receiving a request from the host 300, and may transmit them to the memory device 100. For example, the memory controller 200 may provide commands, addresses, and data to the memory device 100 so as to perform background operations, such as a program operation for wear leveling and a program operation for garbage collection.

The random access memory (RAM) 220 may be implemented as a dynamic RAM (DRAM) or a static RAM (SRAM).

The RAM 220 may be used as a working memory, a cache memory, or a buffer memory of the control component 210. In an embodiment, the RAM 220 may store firmware (FW) run by the control component 210. In various embodiments, the firmware (FW) may also be stored in the memory device 100. The RAM 220 may store pieces of data that are processed by the control component 210.

In an embodiment, the control component 210 may generate or manage an address map indicating information about address mapping between logical block addresses (LBA) and physical block addresses (PBA) in order to translate LBA into PBA. In an embodiment, the address map may include a physical to logical (P2L) map and a logical to physical (L2P) map.

The P2L map may be created based on physical block addresses (PBA). The P2L map may be created by using physical block addresses (PBA) as indices (IDX). The P2L map may include information about logical block addresses (LBA) corresponding to indices (IDX). In an embodiment, the P2L map may be created for each open block in which the storage of data is not completed, among a plurality of memory blocks in the memory device 100.

The L2P map may be created based on logical block addresses (LBA). That is, the L2P map may be created by using logical block addresses (LBA) as indices (IDX). The L2P map may include information about physical block addresses (PBA) corresponding to indices (IDX).

The P2L map and the L2P map may have the same address mapping information. That is, address mapping information acquired by referring to the P2L map may be identical to address mapping information acquired by referring to the L2P map. In order to match the P2L map with the L2P map, the L2P map may be updated based on the P2L map.

In an embodiment, the RAM 220 may store the P2L map and the L2P map. In various embodiments, the P2L map may be stored in an SRAM, and the L2P map may be stored in a DRAM. Alternatively, the address mapping information may be stored in the memory device 100.

The host interface 230 may Interface the host 300 with the storage device 50. In an embodiment, the host interface 230 may communicate with the host 300 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The storage device 50 may be configured as any one of various types of storage devices depending on a host interface communication method with the host 300. For example, the storage device 50 may be implemented as any one of various types of storage devices, e.g., a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms, such as package on package (POP), system in package (SIP), system on chip (SOC), multi-chip package (MCP), chip on board (COB), wafer-level fabricated package (WFP), and wafer-level stack package (WSP).

The memory control component 240 may control the memory device 100 under the control of the control component 210. The memory control component 240 may also be referred to as a "memory interface." The memory control component 240 may provide control signals to the memory device 100. The control signals may include commands, addresses, control signals, etc. for controlling the memory device 100. The memory control component 240 may provide data to the memory device 100 or may be provided with data from the memory device 100.

The host 300 may provide an unmap request to the storage device 50 so that a specific logical block address (LBA) or a physical block address (PBA) mapped to the specific logical block address (LBA) is deleted if necessary. The unmap request provided by the host 300 to the storage device 50 may include an unmap command and an unmap address, which is a logical block address (LBA) for which address mapping information is to be deleted.

The storage device 50 may delete address mapping information for the unmap address from the address map (i.e., the P2L map and the L2P map) in response to the unmap request. The deletion of address mapping information may mean the release of a mapping relationship between an unmap address and a physical block address (PBA) corresponding thereto. In an embodiment, when address mapping information is deleted, data stored at the corresponding physical block address (PBA) may be treated as invalid data.

Figure 2:
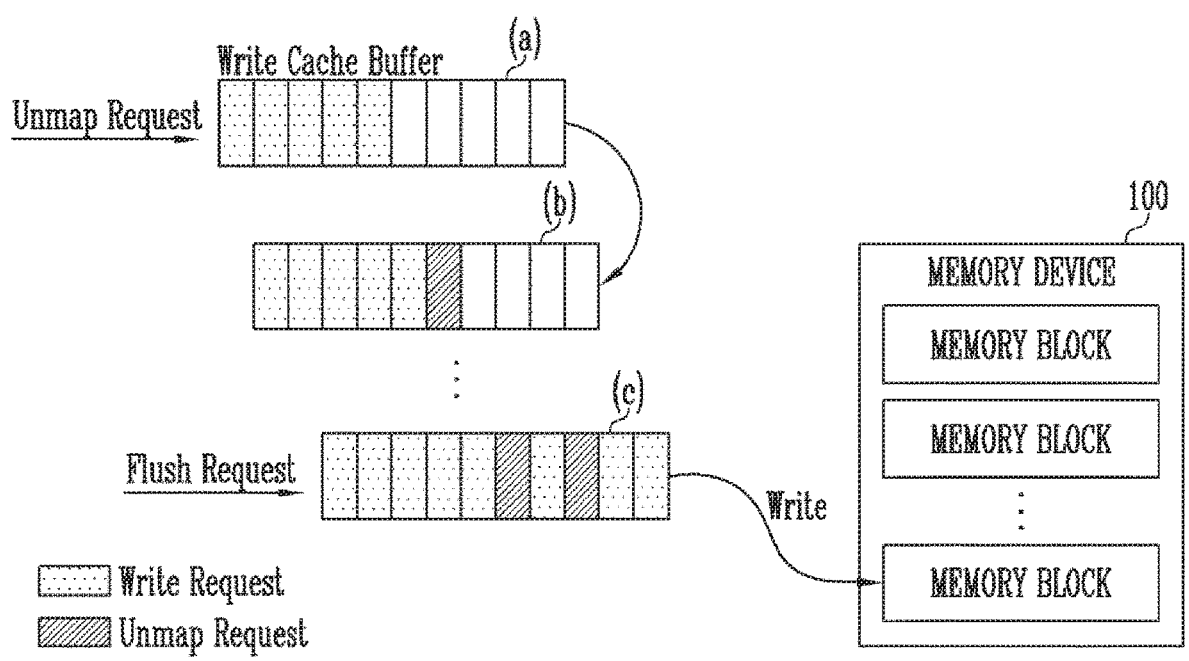
FIG. 2 is a diagram illustrating a method by which a memory controller processes an unmap request according to an embodiment of the present disclosure.

FIG. 2 is a diagram illustrating a method by which the memory controller 200 processes an unmap request according to an embodiment of the present disclosure.

Referring to FIGS. 1 and 2, the memory controller 200 may receive a write request from the host 300. The write request received from the host 300 may include write data and the logical block address (LBA) at which the write data is to be stored in the memory device 100.

The control component 210 may store the logical block address (LBA) and the write data, which are included in the received write request, in a write cache buffer. The write cache buffer may be included in the RAM 220 described above with reference to FIG. 1. In an embodiment, the write cache buffer may be implemented as a static random access memory (SRAM).

The control component 210 may store data, stored in the write cache buffer, in the memory device 100 when an entire storage space of the write cache buffer is used, that is, when an available space does not remain in the write cache buffer. Alternatively, the control component 210 may store data, stored in the write cache buffer, in a memory block in the memory device 100 in response to a flush request received from the host 300.

In accordance with an embodiment of the present disclosure, when an unmap request is received from the host 300, the control component 210 may store, in the write cache buffer, an unmap address in the received unmap request, a flag indicating that the corresponding request is the unmap request, and prestored unmap-pattern data.

In an embodiment, the unmap-pattern data may be pattern data that is predefined depending on the type of storage device 50. The unmap-pattern data may be stored in advance in the RAM 220 or the memory device 100.

The write cache buffer in FIG. 2 (a) stores pieces of data related to write requests. In the state of the write cache buffer, as shown in FIG. 2 (a), an unmap request is received from the host 300 while the write requests are stored in the write cache buffer.

The write cache buffer in FIG. 2 (b) indicates a state in which data related to the unmap request is received. The control component 210 may store, in the write cache buffer, an unmap address in the received unmap request, a flag indicating that the corresponding request is the unmap request, and prestored unmap-pattern data. Here, the unmap address may be a logical block address (LBA) for which address mapping information is to be deleted.

The write cache buffer in FIG. 2 (c) sequentially receives write requests and unmap requests from the host 300 and is full of write requests and unmap requests. Data stored in the write cache buffer may be stored in a memory block of the memory device 100 by the control component 210 in response to a flush request received from the host 300.

A method of processing an unmap request according to an embodiment of the present disclosure will be described in detail with reference to FIGS. 3 to 5.

Figures 3, 4:
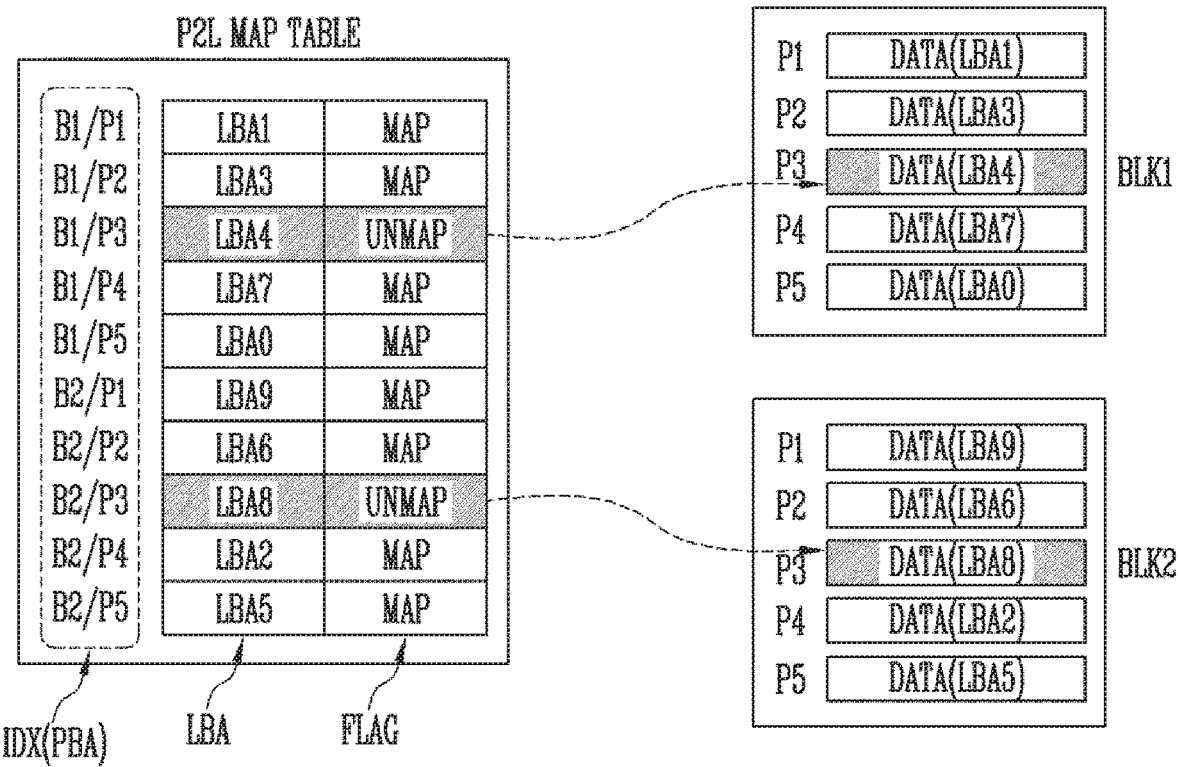
FIG. 3 is a diagram for explaining data stored in a write cache buffer of FIG. 2.
FIG. 4 is a diagram illustrating a P2L map according to an embodiment of the present disclosure.

FIG. 3 is a diagram for explaining data stored in the write cache buffer of FIG. 2.

Referring to FIG. 3, the write cache buffer may store data related to an inputted write request or unmap request. For example, the write cache buffer may store a logical block address (LBA) in the inputted write request or unmap request, data to be stored DATA, and a flag indicating that the corresponding request is the unmap request.

In accordance with the data stored in the write cache buffer, requests for LBA1, 3, 7, 0, 9, and 6 may be write requests. Requests for LBA4 and 8 may be unmap requests.

In detail, LBA1 may be a logical block address in a write request for normal data 1. LBA3 may be a logical block address in a write request for normal data 2, and LBA7 may be a logical block address in a write request for normal data 3. LBA0 may be a logical block address in a write request for normal data 4, and LBA9 may be a logical block address in a write request for normal data 5. LBA6 may be a logical block address in a write request for normal data 6.

LBA4 and LBA8 may be unmap addresses in the unmap requests. Therefore, flags corresponding to LBA1, 3, 7, 0, 9, and 6 may be in a released state. In contrast, flags corresponding to LBA4 and LBA8 may be in a set state. Each flag stored in the write cache buffer indicates whether the corresponding request is an unmap request. For example, the set flag indicates that the corresponding request is an unmap request (UNMAP).

The unmap request received from the host 300 includes an unmap command and an unmap address, which is a logical block address (LBA) for which address mapping information is to be deleted.

Therefore, when storing data related to the unmap request in the write cache buffer, the memory controller may store prestored unmap-pattern data (Unmap DATA) in the write cache buffer. In an embodiment, the unmap-pattern data (Unmap DATA) may be pattern data that is predefined depending on the type of storage device. The unmap-pattern data may be stored in advance in the RAM 220 or the memory device 100 described above with reference to FIG. 1.

In an embodiment, although unmap addresses stored in the write cache buffer are different from each other, pieces of unmap-pattern data thereof may be identical to each other. That is, the unmap-pattern data may be identical for all unmap addresses.

FIG. 4 is a diagram illustrating a P2L map according to an embodiment of the present disclosure.

Figure 5:
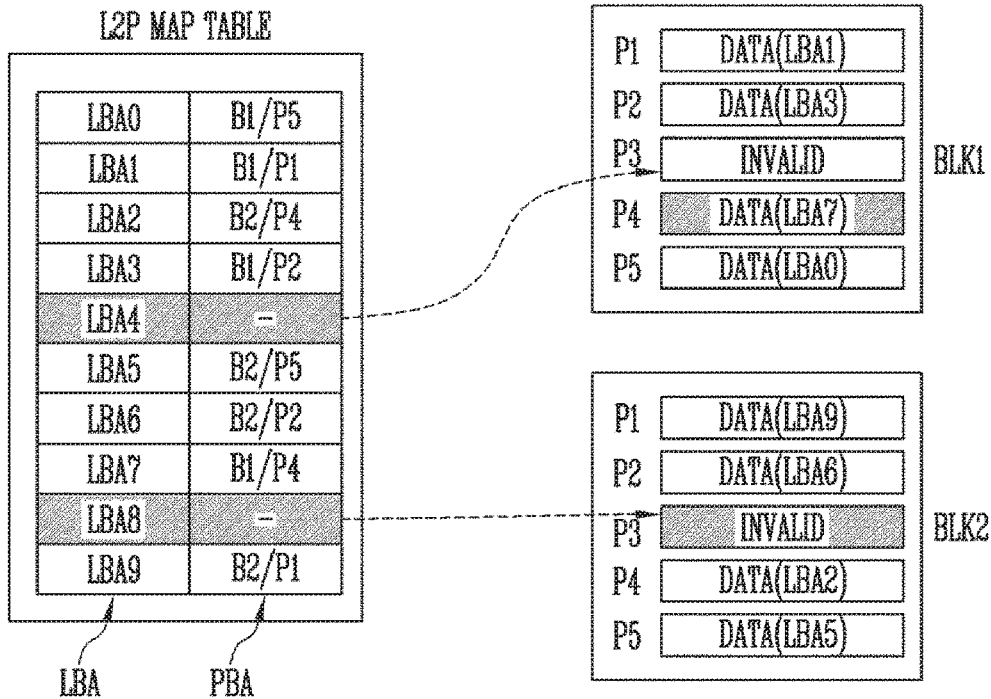
FIG. 5 is a diagram illustrating an L2P map according to an embodiment of the present disclosure.

FIG. 5 is a diagram illustrating an L2P map according to an embodiment of the present disclosure.

In FIGS. 4 and 5, data is stored in memory blocks BLK1, BLK2, and BLKx, each including five pages P1 to P5, and the unmap requests are processed in the memory blocks. However, such configuration is simply an example; the number of memory blocks to which the present disclosure is applied or the number of pages in each memory block is not limited by the embodiments of FIGS. 4 and 5.

Pieces of data stored in the write cache buffer may be processed in response to a flush request received from the host 300. FIG. 4 illustrates a case in which addresses are mapped based on the P2L map when pieces of data stored in the write cache buffer are stored in the memory device 100.

Referring to FIG. 4, the P2L map may be created based on physical block addresses (PBA). The P2L map may be created by using physical block addresses (PBA) as indices (IDX). The P2L map may include information about logical block addresses (LBA) corresponding to indices (IDX). In an embodiment, the P2L map may include a flag indicating that the corresponding request is an unmap request. When the flag is in a set state (UNMAP state), it may mean that the corresponding request is an unmap request, whereas when the flag is in a released state (MAP state), it may mean that the corresponding request is not an unmap request.

Based on the P2L map, LBA1 is mapped to the first page P1 of the first memory block BLK1, LBA3 is mapped to the second page P2 of the first memory block BLK1, LBA7 is mapped to the fourth page P4 of the first memory block BLK1, and LBA0 is mapped to the fifth page P5 of the first memory block BLK1. Further, LBA9 is mapped to the first page P1 of the second memory block BLK2, LBA6 is mapped to the second page P2 of the second memory block BLK2, LBA2 is mapped to the fourth page P4 of the second memory block BLK2, and LBA5 is mapped to the fifth page P5 of the second memory block BLK2.

The memory controller 200 described above with reference to FIG. 1 may control the memory device 100 so that write data corresponding to the write request is stored at the corresponding physical block address (PBA) through address mapping in the P2L map.

LBA4 may be mapped to the third page P3 of the first memory block BLK1, and LBA8 may be mapped to the third page P3 of the second memory block BLK2. However, since the flags of the requests are in the set state (UNMAP state), it can be seen that the requests for the corresponding LBAs are unmap requests. Therefore, for the corresponding LBAs, data stored in the write cache buffer may be unmap-pattern data.

The memory controller 200 may perform address mapping at LBA4 and LBA8 on the P2L map, but may not actually store data at PBAs mapped to LBA4 and LBA8.

Referring to FIG. 5, the L2P map may be created based on logical block addresses (LBA). That is, the L2P map may be created by using logical block addresses (LBA) as indices (IDX). The L2P map may Include information about physical block addresses (PBA) corresponding to indices (IDX).

The P2L map and the L2P map may have the same address mapping information. That is, address mapping information acquired by referring to the P2L map may be identical to address mapping information acquired by referring to the L2P map. In order to match the P2L map with the L2P map, the L2P map may be updated based on the P2L map.

Referring to FIG. 5, when the L2P map is updated based on the P2L map, the memory controller 200 may process unmap requests for LBA4 and LBA8 at which the flags of the P2L map of FIG. 4 are in the set state (UNMAP state). In detail, when the L2P map is updated, the memory controller 200 may delete physical addresses corresponding to LBAs at which the flags of the P2L map are in the set state (UNMAP state).

Figure 6:
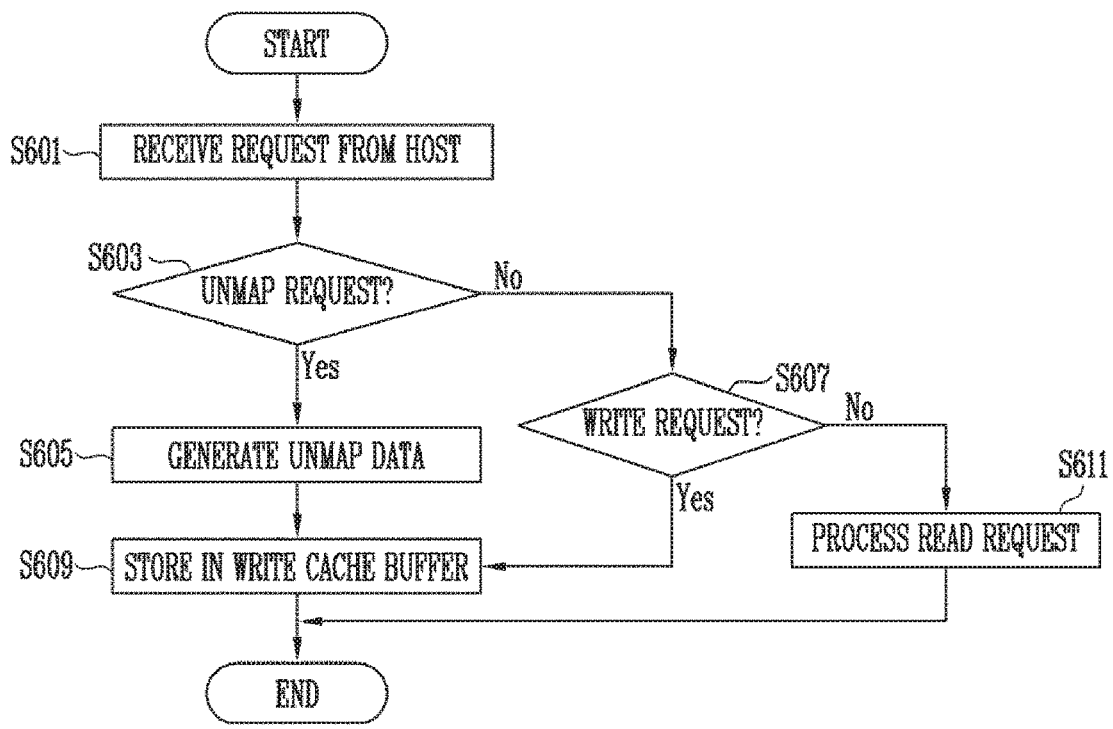
FIG. 6 is a flowchart describing an operation of the memory controller according to an embodiment of the present disclosure.

FIG. 6 is a flowchart illustrating the operation of the memory controller 200 according to an embodiment of the present disclosure.

Referring to FIG. 6, in conjunction with FIG. 1, the memory controller 200 may receive a request from the host 300 at step S601. In an embodiment, the request may be any one of a write request, a read request, or an unmap request.

At step S603, the memory controller 200 may determine whether the received request is an unmap request. When the request received at step S601 is the unmap request (that is, "Yes" at step S603), the process proceeds to step S605, whereas when the received request is not an unmap request (that is, "No" at step S603), the process proceeds to step S607.

At step S605, the memory controller 200 may generate unmap data. The unmap data may be the above-described unmap-pattern data. In detail, the unmap-pattern data may be pattern data that is predefined depending on the type of storage device including the memory controller 200. The unmap-pattern data may be stored in advance in the RAM 220 or the memory device 100.

At step S607, the memory controller 200 may determine whether the received request is a write request. When the request received at step S601 Is the write request (that is, "Yes" at step S607), the process proceeds to step S609, whereas when the received request is not a write request (that is, "No" at step S607), the process proceeds to step S611.

At step S609, when the received request is the unmap request, the memory controller 200 may store, in the write cache buffer, an unmap address, a flag indicating that the corresponding request is the unmap request, and the generated unmap data.

At step S609, when the received request is the write request, the memory controller 200 may store, in the write cache buffer, an LBA in the write request, write data, and a flag indicating that the request corresponding to the LBA is not an unmap request.

At step S611, when the received request from the host is neither the unmap request nor the write request, the memory controller 200 may process the received request because it is a read request.

A method of processing the read request will be described in detail below with reference to FIG. 7, which is a flowchart describing the operation of the memory controller 200 according to an embodiment of the present disclosure.

Figure 7:
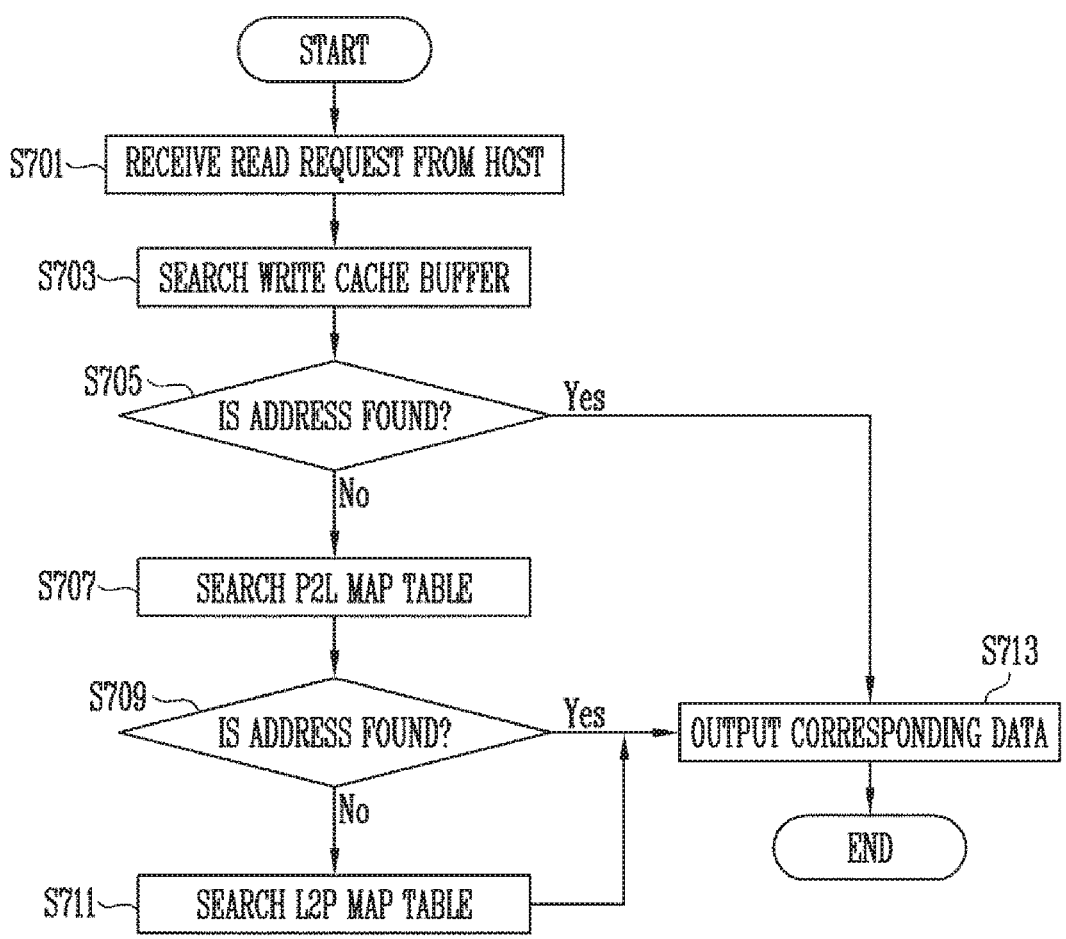
FIG. 7 is a flowchart describing an operation of the memory controller according to an embodiment of the present disclosure.

FIG. 7 illustrates the operation of the memory controller 200 which processes a read request. Referring to FIG. 7, the memory controller may receive a read request from a host at step S701.

The read request may include a logical block address (LBA) required by the memory controller 200. The memory controller 200 may search for data corresponding to the LBA in the read request in order to output the data corresponding to the LBA to the host 300. In detail, the data corresponding to the LBA in the read request may be in a state in which the data is already stored in the memory device 100 or in a state in which it is inputted to the write cache buffer of the memory controller 200 without being stored in the memory device 100.

When the data corresponding to the LBA in the read request is already stored in the memory device 100, the LBA will be stored in the P2L map or the L2P map. Alternatively, when the data corresponding to the LBA in the read request is in a state in which it is inputted to the write cache buffer of the memory controller 200, the corresponding LBA will be stored in the write cache buffer.

At step S703, the memory controller 200 may search the write cache buffer to determine whether the LBA in the read request is stored in the write cache buffer.

At step S705, the memory controller 200 may determine whether the LBA in the read request is found in the write cache buffer. If so (that is, "Yes" at step S705), the memory controller 200 proceeds to step S713 where the data stored in the write cache buffer may be outputted. When the LBA in the read request is not found in the write cache buffer (that is, "No" at step S705), the memory controller 200 proceeds to step S707.

At step S707, the memory controller 200 may search a P2L map table to determine whether the LBA in the read request is stored in the P2L map table.

At step S709, the memory controller 200 may determine whether the LBA in the read request is found in the P2L map table. If so (that is, "Yes" at step S709), the memory controller 200 proceeds to step S713 where a PBA may be acquired depending on address mapping information for the LBA in the read request using the P2L map table and where data stored at the corresponding PBA may be read. The memory controller 200 may output the read data to the host 300. When the LBA in the read request is not found in the P2L map table (that is, "No" at step S709), the memory controller 200 proceeds to step S711.

At step S711, the memory controller 200 may search an L2P map table for the LBA in the read request. Thereafter, the memory controller 200 proceeds to step S713. The memory controller 200 may acquire a PBA depending on the address mapping information for the LBA in the read request using the L2P map table, and may read data stored at the PBA. The memory controller 200 may output the read data to the host 300.

In accordance with an embodiment of the present disclosure, when an unmap request is received from the host 300, the memory controller 200 may store, in the write cache buffer, an unmap address, a flag indicating that the corresponding request is the unmap request, and prestored unmap-pattern data. Therefore, when a read request for the unmap address in the unmap request is received in a state in which the unmap request is stored in the write cache buffer, the memory controller 200 may output unmap-pattern data, stored in the write cache buffer, in response to the read request in the same way as a typical read request. That is, the memory controller 200 may output unmap-pattern data, stored in the write cache buffer, in response to the read request in the same way as a typical read request, without determining whether an LBA in the read request is an unmap address.

Figure 8:
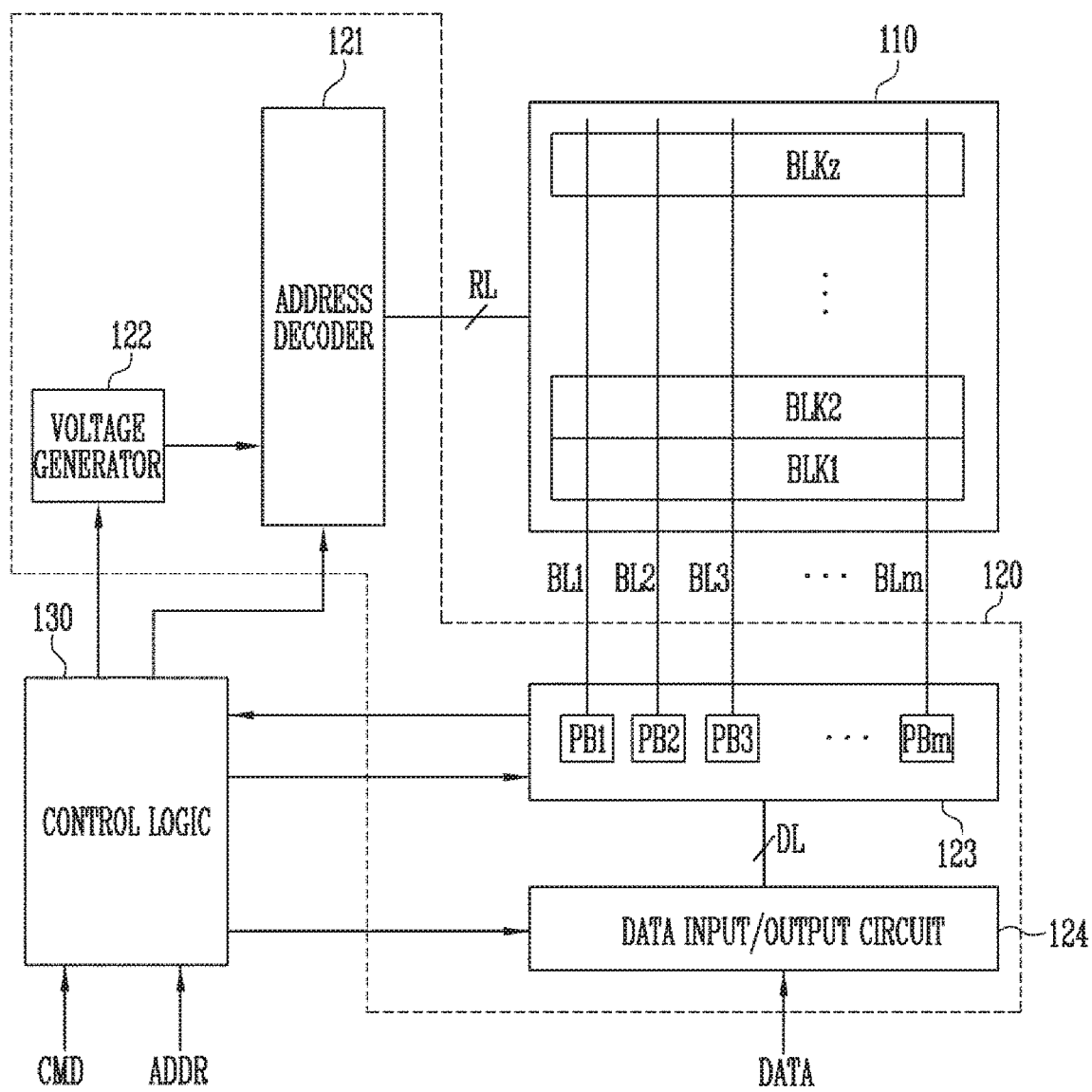
FIG. 8 is a diagram illustrating a structure of a memory device of FIG. 1.

FIG. 8 is a diagram illustrating the structure of the memory device 100 of FIG. 1.

Referring to FIG. 8, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz are coupled to an address decoder 121 through row lines RL. The memory blocks BLK1 to BLKz are coupled to a read and write circuit 123 through bit lines BL1 to BLm. Each of the memory blocks BLK1 to BLKz includes a plurality of memory cells. In an embodiment, the plurality of memory cells are nonvolatile memory cells. Memory cells coupled to the same word line are defined as a single page. That is, the memory cell array 110 is composed of a plurality of pages. In an embodiment, each of the plurality of memory blocks BLK1 to BLKz may include one or more dummy cells which may be coupled in series between a drain select transistor and the memory cells and between a source select transistor and the memory cells.

Each of the memory cells of the memory device 100 may be implemented as a single-level cell (SLC) capable of storing a single data bit, a multi-level cell (MLC) capable of storing two data bits, a triple-level cell (TLC) capable of storing three data bits, or a quad-level cell (QLC) capable of storing four data bits.

The peripheral circuit 120 may include an address decoder 121, a voltage generator 122, the read and write circuit 123, and a data input/output circuit 124.

The peripheral circuit 120 may drive the memory cell array 110. For example, the peripheral circuit 120 may drive the memory cell array 110 so that a program operation, a read operation, and an erase operation are performed.

The address decoder 121 is coupled to the memory cell array 110 through row lines RL. The row lines RL may include drain select lines, word lines, source select lines, and a common source line. In an embodiment, the word lines may include normal word lines and dummy word lines. In an embodiment, the row lines RL may further include a pipe select line.

The address decoder 121 is configured to be operated under the control of the control logic 130. The address decoder 121 receives the address ADDR from the control logic 130.

The address decoder 121 is configured to decode a block address of the received address ADDR. The address decoder 121 selects at least one memory block from among the memory blocks BLK1 to BLKz in response to the decoded block address. The address decoder 121 is configured to decode a row address of the received address ADDR. The address decoder 121 may select at least one word line of the selected memory block by applying voltages supplied from the voltage generator 122 to at least one word line WL in response to the decoded row address.

During a program operation, the address decoder 121 may apply a program voltage to the selected word line and apply a pass voltage having a level lower than that of the program voltage to unselected word lines. During a program verify operation, the address decoder 121 may apply a verify voltage to a selected word line and apply a verification pass voltage higher than the verify voltage to unselected word lines.

During a read operation, the address decoder 121 may apply a read voltage to a selected word line and apply a pass voltage higher than the read voltage to unselected word lines.

In an embodiment, the erase operation of the memory device 100 may be performed on a memory block basis. During an erase operation, the address ADDR inputted to the memory device 100 includes a block address. The address decoder 121 may decode the block address and select a single memory block in response to the decoded block address. During the erase operation, the address decoder 121 may apply a ground voltage to word lines coupled to the selected memory block.

In an embodiment, the address decoder 121 may be configured to decode a column address of the received address ADDR. A decoded column address (DCA) may be transferred to the read and write circuit 123. In an exemplary embodiment, the address decoder 121 may include components such as a row decoder, a column decoder, and an address buffer.

The voltage generator 122 is configured to generate a plurality of voltages using an external supply voltage provided to the memory device 100. The voltage generator 122 is operated under the control of the control logic 130.

In an embodiment, the voltage generator 122 may generate an internal supply voltage by regulating the external supply voltage. The internal supply voltage generated by the voltage generator 122 is used as an operating voltage of the memory device 100.

In an embodiment, the voltage generator 122 may generate a plurality of voltages using an external supply voltage or an internal supply voltage. The voltage generator 122 may be configured to generate various voltages required by the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal supply voltage, and may generate a plurality of voltages by selectively activating the pumping capacitors under the control of the control logic 130.

The generated voltages may be supplied to the memory cell array 110 by the address decoder 121.

The read and write circuit 123 includes first to m-th page buffers PB1 to PBm, which are coupled to the memory cell array 110 through the first to m-th bit lines BL1 to BLm, respectively. The first to m-th page buffers PB1 to PBm are operated under the control of the control logic 130.

The first to m-th page buffers PB1 to PBm perform data communication with the data input/output circuit 124. During a program operation, the first to m-th page buffers PB1 to PBm receive data to be stored DATA through the data input/output circuit 124 and data lines DL.

During a program operation, the first to m-th page buffers PB1 to PBm may transfer the data, received through the data input/output circuit 124, to selected memory cells through the bit lines BL1 to BLm when a program pulse is applied to each selected word line. The memory cells in the selected page are programmed based on the transferred data. Memory cells coupled to a bit line to which a program permission voltage (e.g., a ground voltage) is applied may have increased threshold voltages. Threshold voltages of memory cells coupled to a bit line to which a program prohibition voltage (e.g., a supply voltage) is applied may be maintained. During a program verify operation, the first to m-th page buffers may read page data from the selected memory cells through the bit lines BL1 to BLm.

During a read operation, the read and write circuit 123 may read data DATA from the memory cells in the selected page through the bit lines BL, and may output the read data DATA to the data input/output circuit 124.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated under the control of the control logic 130.

The data input/output circuit 124 may include a plurality of input/output buffers (not illustrated) for receiving input data. During a program operation, the data input/output circuit 124 receives data to be stored DATA from an external controller (not illustrated). During a read operation, the data input/output circuit 124 outputs the data, received from the first to m-th page buffers PB1 to PBm in the read and write circuit 123, to the external controller.

The control logic 130 may be coupled to the address decoder 121, the voltage generator 122, the read and write circuit 123, and the data input/output circuit 124. The control logic 130 may control the overall operation of the memory device 100. The control logic 130 may be operated in response to a command CMD received from an external device.

Figure 9:
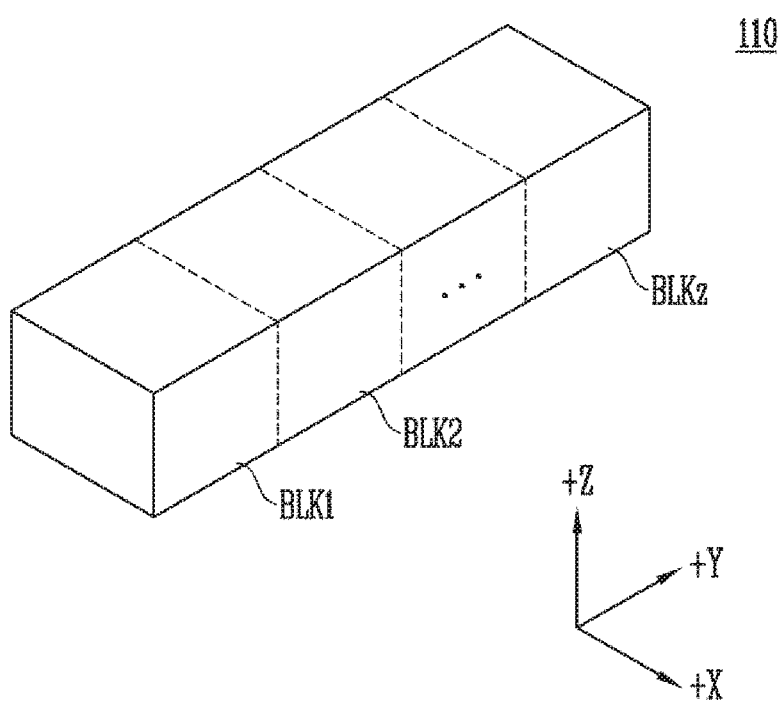
FIG. 9 is a diagram illustrating an embodiment of a memory cell array of FIG. 8.

FIG. 9 is a diagram illustrating an embodiment of the memory cell array of FIG. 8.

Referring to FIG. 9, the memory cell array 110 includes a plurality of memory blocks BLK1 to BLKz. Each memory block may have a three-dimensional (3D) structure. Each memory block includes a plurality of memory cells stacked on a substrate. Such memory cells are arranged along a positive X (+X) direction, a positive Y (+Y) direction, and a positive Z (+Z) direction. The structure of each memory block will be described in detail below with reference to FIGS. 10 and 11.

Figure 10:
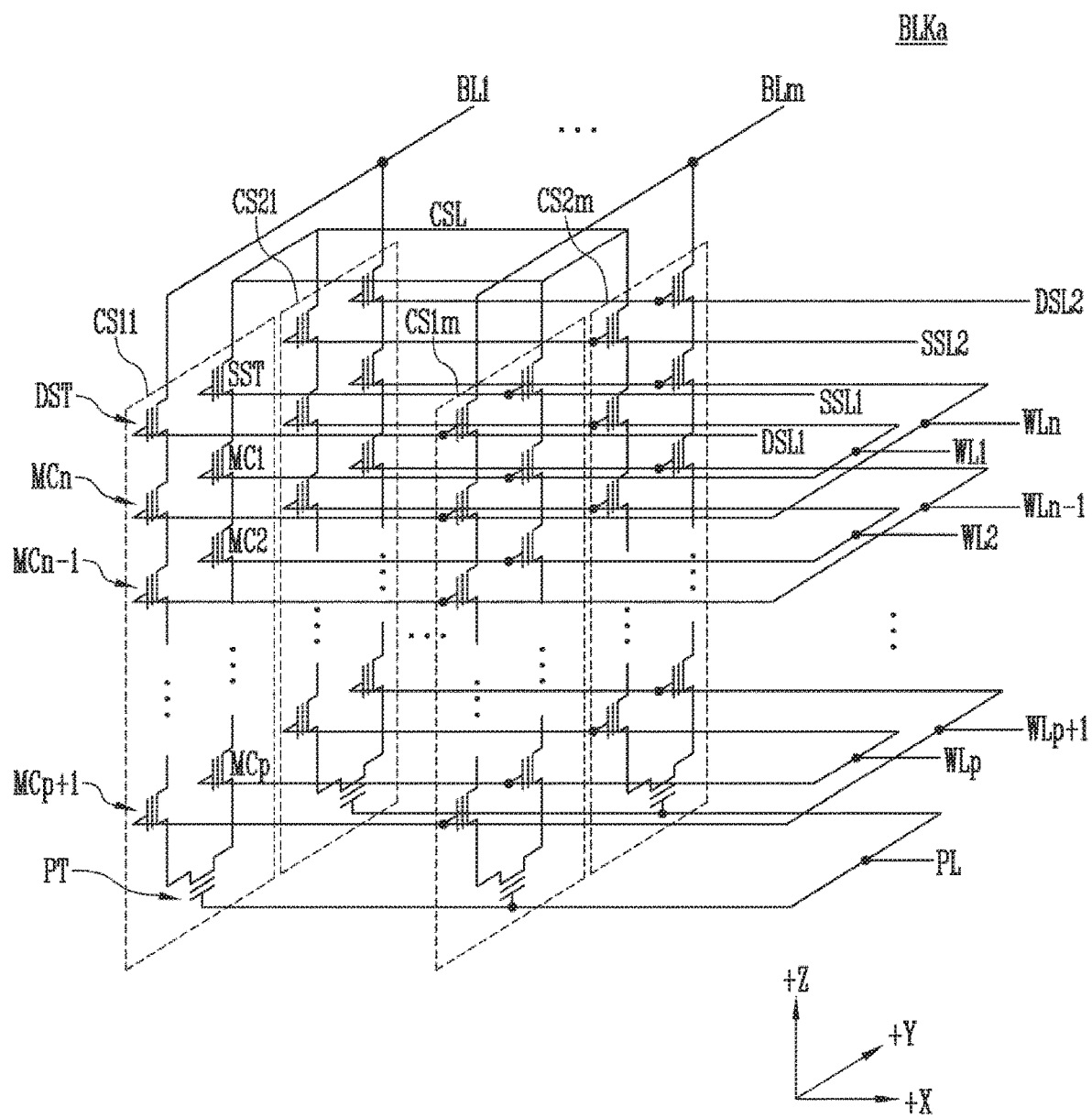
FIG. 10 is a circuit diagram illustrating an exemplary configuration of any one memory block BLKa of memory blocks BLK1 to BLKz of FIG. 9.

FIG. 10 is a circuit diagram illustrating any one memory block BLKa of the memory blocks BLK1 to BLKz of FIG. 9.

Referring to FIG. 10, the memory block BLKa includes a plurality of cell strings CS11 to CS1m and CS21 to CS2m. In an embodiment, each of the cell strings CS11 to CS1m and CS21 to CS2m may be formed in a 'U' shape. In the memory block BLKa, m cell strings are arranged in a row direction (i.e. a positive (+) X direction). In FIG. 10, two cell strings are illustrated as being arranged in a column direction (i.e. a positive (+) Y direction). However, this illustration is made for convenience of description, and it will be understood that three or more cell strings may be arranged in the column direction.

Each of the plurality of cell strings CS11 to CS1m and CS21 to CS2m includes at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided to each cell string. In an embodiment, a pillar for providing at least one of the channel layer, the tunneling insulating layer, the charge storage layer, and the blocking insulating layer may be provided to each cell string.

The source select transistor SST of each cell string is connected between the common source line CSL and memory cells MC1 to MCp.

In an embodiment, the source select transistors of cell strings arranged in the same row are coupled to a source select line extending in a row direction, and source select transistors of cell strings arranged in different rows are coupled to different source select lines. In FIG. 10, source select transistors of cell strings CS11 to CS1m in a first row are coupled to a first source select line SSL1. The source select transistors of cell strings CS21 to CS2m in a second row are coupled to a second source select line SSL2.

In an embodiment, source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and p+1-th to n-th memory cells MCp+1 to MCn. The first to p-th memory cells MC1 to MCp are sequentially arranged in a negative (−) Z direction and are connected in series between the source select transistor SST and the pipe transistor PT. The p+1-th to n-th memory cells MCp+1 to MCn are sequentially arranged in the +Z direction and are connected in series between the pipe transistor PT and the drain select transistor DST. The first to p-th memory cells MC1 to MCp and the p+1-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

A gate of the pipe transistor PT of each cell string is coupled to a pipeline PL.

The drain select transistor DST of each cell string is connected between the corresponding bit line and the memory cells MCp+1 to MCn. The cell strings in a row direction are coupled to drain select lines extending in a row direction. Drain select transistors of cell strings CS11 to CS1$m$ in the first row are coupled to a first drain select line DSL1. Drain select transistors of cell strings CS21 to CS2$m$ in a second row are coupled to a second drain select line DSL2.

Cell strings arranged in a column direction are coupled to bit lines extending in a column direction. In FIG. 10, cell strings CS11 and CS21 in a first column are coupled to a first bit line BL1. Cell strings CS1$m$ and CS2$m$ in an m-th column are coupled to an m-th bit line BLm.

The memory cells coupled to the same word line in cell strings arranged in a row direction constitute a single page. For example, memory cells coupled to the first word line WL1, among the cell strings CS11 to CS1$m$ in the first row, constitute a single page. Memory cells coupled to the first word line WL1, among the cell strings CS21 to CS2$m$ in the second row, constitute a single additional page. Cell strings arranged in the direction of a single row may be selected by selecting any one of the drain select lines DSL1 and DSL2. A single page may be selected from the selected cell strings by selecting any one of the word lines WL1 to WLn.

In an embodiment, even bit lines and odd bit lines, instead of first to m-th bit lines BL1 to BLm, may be provided. Further, even-numbered cell strings, among the cell strings CS11 to CS1$m$ or CS21 to CS2$m$ arranged in a row direction, may be coupled to the even bit lines, respectively, and odd-numbered cell strings, among the cell strings CS11 to CS1$m$ or CS21 to CS2$m$ arranged in the row direction, may be coupled to the odd bit lines, respectively.

In an embodiment, one or more of the first to n-th memory cells MC1 to MCn may be used as dummy memory cells. For example, one or more dummy memory cells are provided to reduce an electric field between the source select transistor SST and the memory cells MC1 to MCp. Alternatively, the one or more dummy memory cells are provided to reduce an electric field between the drain select transistor DST and the memory cells MCp+1 to MCn. As more dummy memory cells are provided, the reliability of the operation of the memory block BLKa is improved, but the size of the memory block BLKa is increased. As fewer memory cells are provided, the size of the memory block BLKa is reduced, but the reliability of the operation of the memory block BLKa may be deteriorated.

In order to efficiently control the dummy memory cell(s), each of the dummy memory cells may have a required threshold voltage. Before or after the erase operation of the memory block BLKa is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 11:
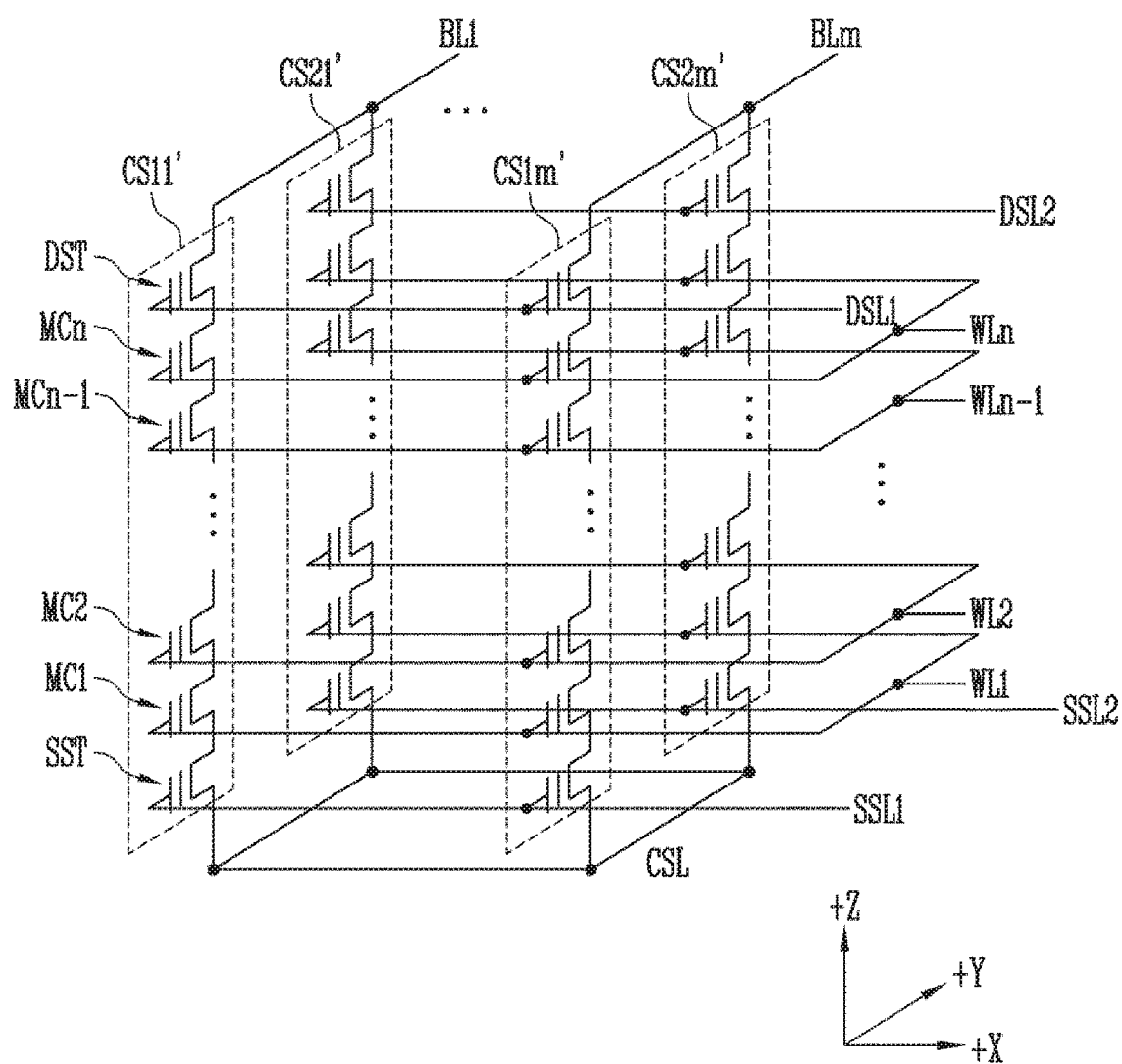
FIG. 11 is a circuit diagram illustrating an exemplary configuration of any one memory block BLKb of the memory blocks BLK1 to BLKz of FIG. 9.

FIG. 11 is a circuit diagram illustrating an example of any one memory block BLKb of the memory blocks BLK1 to BLKz of FIG. 9.

Referring to FIG. 11, the memory block BLKb includes a plurality of cell strings CS11' to CS1$m$' and CS21' to CS2$m$'. Each of the plurality of cell strings CS11' to CS1$m$' and CS21' to CS2$m$' extends along a positive Z (+Z) direction. Each of the cell strings CS11' to CS1$m$' and CS21' to CS2$m$' includes at least one source select transistor SST, first to n-th memory cells MC1 to MCn, and at least one drain select transistor DST, which are stacked on a substrate (not illustrated) below the memory block BLKb.

The source select transistor SST of each cell string is connected between a common source line CSL and memory cells MC1 to MCn. The source select transistors of cell strings arranged in the same row are coupled to the same source select line. Source select transistors of cell strings CS11' to CS1$m$' arranged in a first row are coupled to a first source select line SSL1. Source select transistors of cell strings CS21' to CS2$m$' arranged in a second row are coupled to a second source select line SSL2. In an embodiment, source select transistors of the cell strings CS11' to CS1$m$' and CS21' to CS2$m$' may be coupled in common to a single source select line.

The first to n-th memory cells MC1 to MCn in each cell string are connected in series between the source select transistor SST and the drain select transistor DST. The gates of the first to n-th memory cells MC1 to MCn are coupled to first to n-th word lines WL1 to WLn, respectively.

The drain select transistor DST of each cell string is connected between the corresponding bit line and the memory cells MC1 to MCn. Drain select transistors of cell strings arranged in a row direction are coupled to drain select lines extending in a row direction. The drain select transistors of the cell strings CS11' to CS1$m$' in the first row are coupled to a first drain select line DSL1. The drain select transistors of the cell strings CS21' to CS2$m$' in the second row are coupled to a second drain select line DSL2.

As a result, the memory block BLKb of FIG. 11 has a circuit similar or equivalent to that of the memory block BLKa of FIG. 10, except that a pipe transistor PT is excluded from each cell string.

In an embodiment, even bit lines and odd bit lines, instead of first to m-th bit lines BL1 to BLm, may be provided. Further, even-numbered cell strings, among the cell strings CS11' to CS1$m$' or CS21' to CS2$m$' arranged in a row direction, may be coupled to the even bit lines, respectively, and odd-numbered cell strings, among the cell strings CS11' to CS1$m$' or CS21' to CS2$m$' arranged in the row direction, may be coupled to the odd bit lines, respectively.

In an embodiment, one or more of the first to n-th memory cells MC1 to MCn may be used as dummy memory cells. For example, the one or more dummy memory cells are provided to reduce an electric field between the source select transistor SST and the memory cells MC1 to MCn. Alternatively, the one or more dummy memory cells are provided to reduce an electric field between the drain select transistor DST and the memory cells MC1 to MCn. As more dummy memory cells are provided, the reliability of the operation of the memory block BLKb is improved, but the size of the memory block BLKb is increased. As fewer memory cells are provided, the size of the memory block BLKb is reduced, but the reliability of the operation of the memory block BLKb may be deteriorated.

In order to efficiently control the dummy memory cell(s), each of the dummy memory cells may have a required threshold voltage. Before or after the erase operation of the memory block BLKb is performed, a program operation may be performed on all or some of the dummy memory cells. When an erase operation is performed after the program operation has been performed, the threshold voltages of the dummy memory cells control the voltages that are applied to the dummy word lines coupled to respective dummy memory cells, and thus the dummy memory cells may have required threshold voltages.

Figure 12:
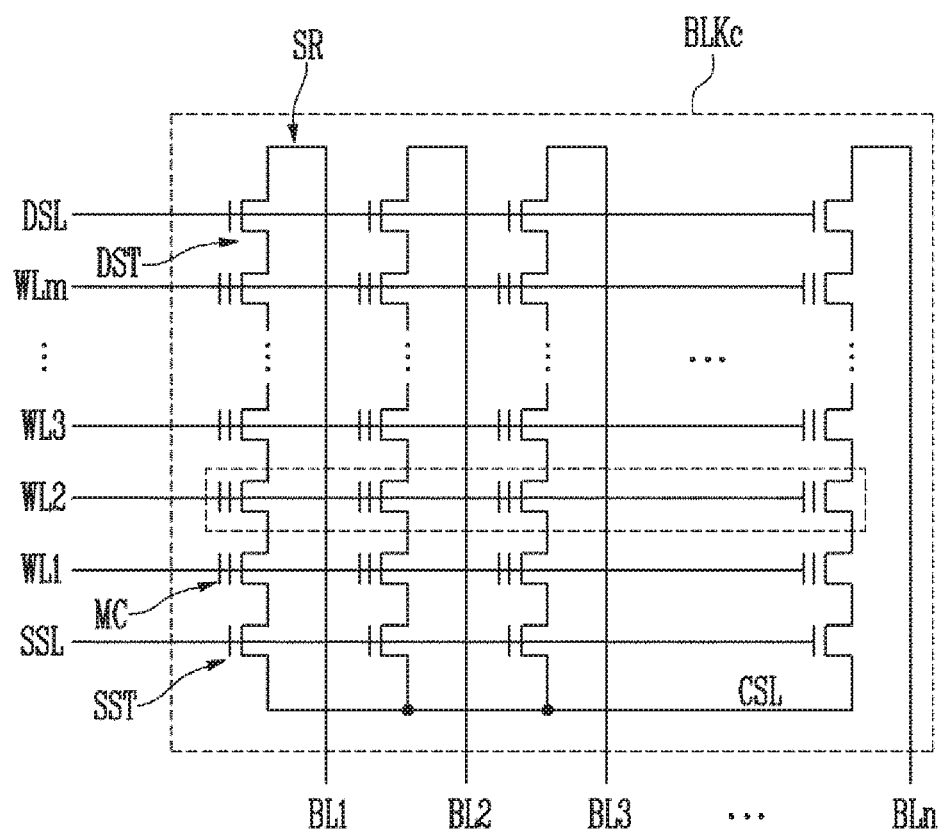
FIG. 12 is a circuit diagram illustrating an exemplary configuration of any one memory block BLKc of a plurality of memory blocks BLK1 to BLKz included in the memory cell array 110 of FIG. 8.

FIG. 12 is a circuit diagram illustrating an example of any one memory block BLKc of a plurality of memory blocks BLK1 to BLKz in the memory cell array 110 of FIG. 8.

Referring to FIG. 12, the memory block BLKc may include a plurality of strings SR. The plurality of strings SR may be respectively coupled to a plurality of bit lines BL1 to BLn. Each string SR may include a source select transistor SST, memory cells MC, and a drain select transistor DST.

The source select transistor SST In each string SR may be coupled between the memory cells MC and a common source line CSL. The source select transistors SST of the plurality of strings SR may be coupled in common to the common source line CSL.

The drain select transistor DST in each string SR may be coupled between the memory cells MC and the corresponding bit line BL. The drain select transistors DST of the plurality of strings SR may be respectively coupled to the plurality of bit lines BL1 to BLn.

In each string SR, a plurality of memory cells MC may be provided between the source select transistor SST and the drain select transistor DST. In each string SR, the memory cells MC may be coupled in series to each other.

In the strings SR, memory cells MC disposed at the same sequential positions from the common source line CSL may be coupled in common to a single word line. The memory cells MC of the plurality of strings SR may be coupled to a plurality of word lines WL1 to WLm.

In the memory block BLKc, an erase operation may be performed on a memory block basis. When the erase operation is performed on a memory block basis, all memory cells MC in the memory block BLKc may be simultaneously erased in response to a single erase request.

Figure 13:
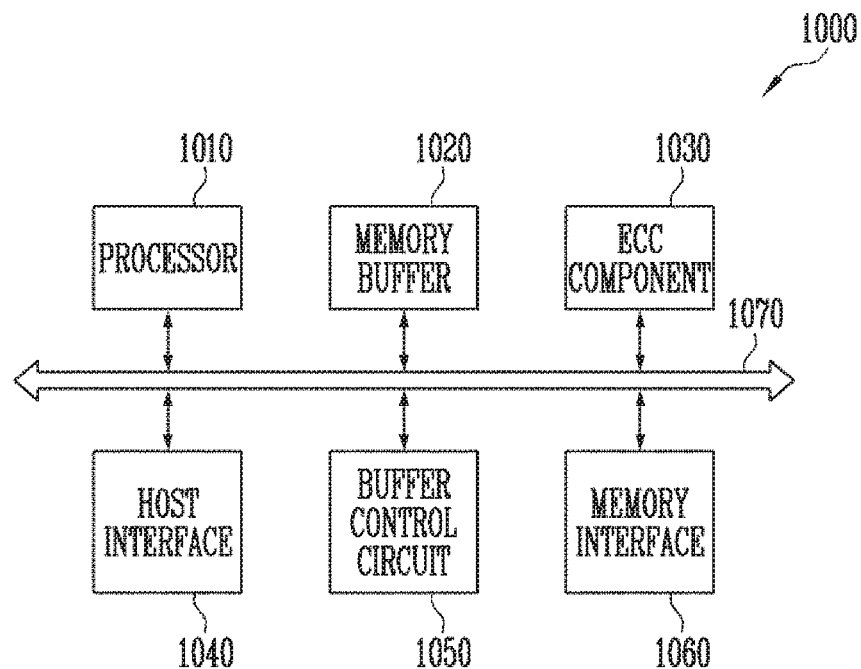
FIG. 13 is a diagram illustrating an embodiment of the memory controller 200 of FIG. 1.

FIG. 13 is a diagram illustrating an embodiment of the memory controller 200 of FIG. 1.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 13, the memory controller 1000 may include a processor 1010, a memory buffer 1020, an error checking and correction unit (ECC) component 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host Interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processing unit 1010 may use a randomizing seed to randomize data received from the host. The randomized data may be provided, as data to be stored, to the memory device and may be programmed in the memory cell array.

The processor may derandomize data received from the memory device during a read operation. For example, the processor 1010 may derandomize the data received from the memory device using a derandomizing seed. The derandomized data may be outputted to the host.

In an embodiment, the processor 1010 may run software or firmware to perform randomizing and derandomizing operations.

In an embodiment, the processor 1010 may function as the control component 210 described above with reference to FIG. 1.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC component 1030 may perform error correction. The ECC component 1030 may perform error correction code (ECC) encoding based on data to be written to the memory device through the memory Interface 1060. The ECC-encoded data may be transferred to the memory device through the memory interface 1060. The ECC component 1030 may perform ECC decoding based on data received from the memory device through the memory interface 1060. In an example, the ECC component 1030 may be included as a component of the memory Interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not Include the memory buffer 1020 and the buffer control circuit 1050, which components may be provided separately or their functions distributed within the memory controller 1000.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, so that neither interferes with nor influences the other. The data bus may be coupled to the host interface 1040, the buffer control circuit 1050, the ECC unit 1030, and the memory interface 1060. The control bus may be coupled to the host Interface 1040, the processor 1010, the buffer control circuit 1050, the memory buffer 1020, and the memory interface 1060.

Figure 14:
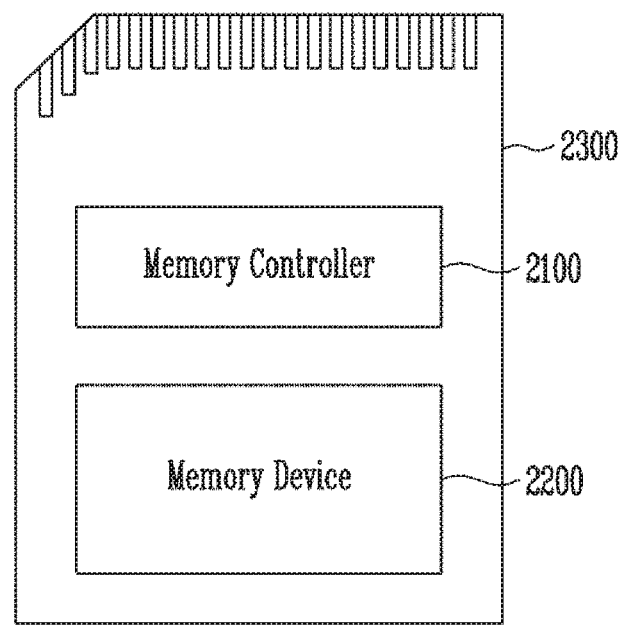
FIG. 14 is a block diagram illustrating a memory card system to which the storage device according to an embodiment of the present disclosure may be applied.

FIG. 14 is a block diagram illustrating a memory card system to which the storage device according to an embodiment of the present disclosure is applied.

Referring to FIG. 14, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same way as the memory controller 200 described above with reference to FIG. 1.

In an embodiment, the memory controller 2100 may include components, such as a RAM, a processor, a host interface, a memory interface, and an ECC component.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk Interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be Implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-MRAM).

The memory controller 2100 and the memory device 2200 may be integrated into a single semiconductor device to configure a memory card such as a PC card (personal computer memory card international association: PCM-CIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 15:
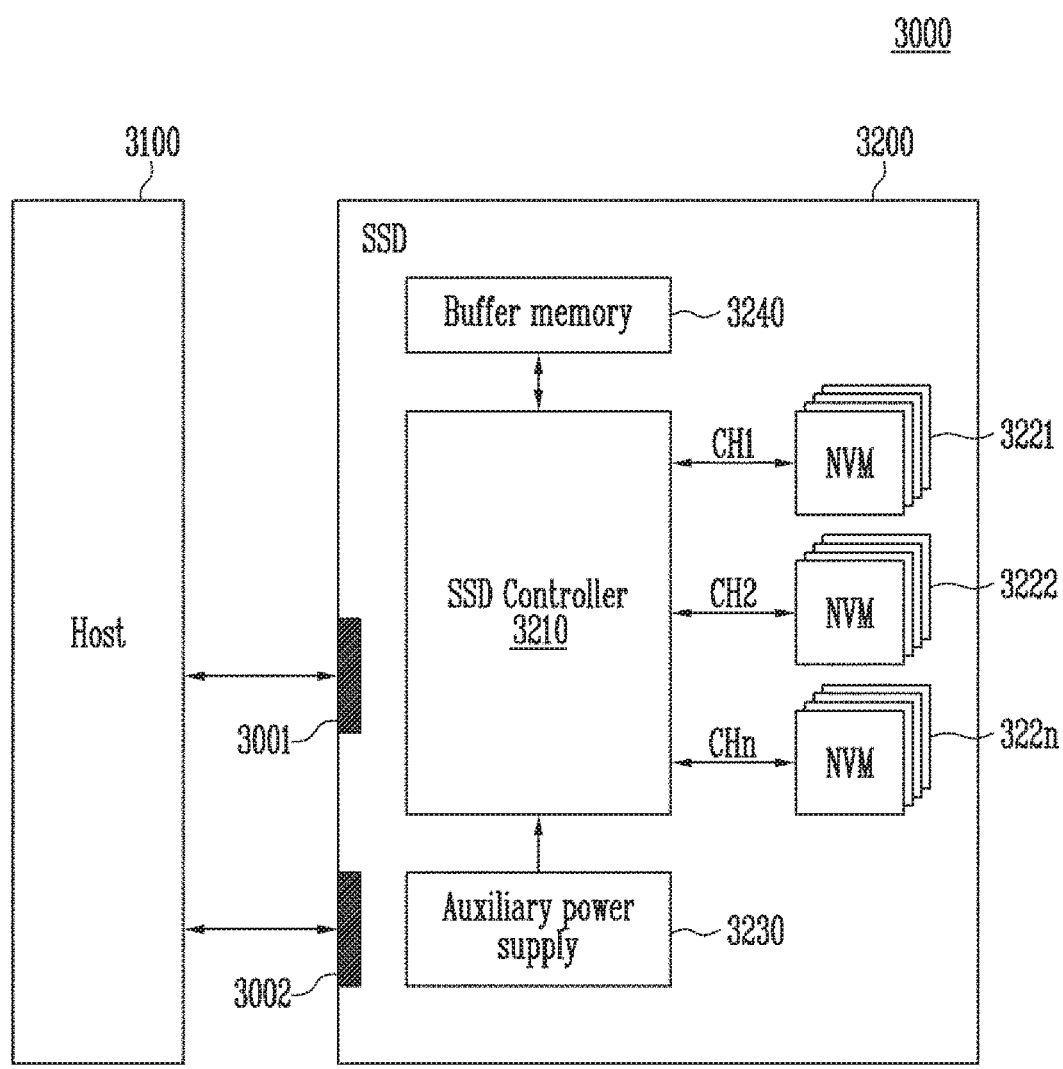
FIG. 15 is a block diagram illustrating an example of a solid state drive (SSD) system to which the storage device according to an embodiment of the present disclosure may be applied.

FIG. 15 is a block diagram illustrating an example of a solid state drive (SSD) system to which the storage device according to an embodiment of the present disclosure may be applied.

Referring to FIG. 15, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be based on the interfaces of the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be within the SSD 3200. Alternatively, the auxiliary power supply 3230 may be external to the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

FIG. 16 is a block diagram illustrating a user system to which the storage device according to an embodiment of the present disclosure may be applied.

Referring to FIG. 16, a user system 4000 may include an application processor 4100, a memory module 4200, a network module 4300, a storage module 4400, and a user interface 4500.

The application processor 4100 may run components in the user system 4000, an Operating System (OS) or a user program. In an embodiment, the application processor 4100 may include controllers, interfaces, graphic engines, etc. for controlling the components in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 400.

In an embodiment, the storage module 4400 may include a plurality of nonvolatile memory devices, each of which may be operated in the same way as the memory device described above with reference to FIGS. 8 to 12. The storage module 4400 may be operated in the same way as the storage device 50 described above with reference to FIG. 1.

The user interface 4500 may include interfaces which input data or instructions to the application processor 4100 or output data to an external device. In an embodiment, the user interface 4500 may include one or more user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a motor.

In accordance with an embodiment of the present disclosure, when an unmap request is received from the host, the memory controller may store an unmap address, a flag indicating that the corresponding request is the unmap request, and prestored unmap-pattern data in a write cache buffer. Therefore, when a read request for the unmap address is subsequently received, the memory controller may output the unmap-pattern data stored in the write cache buffer in response to the read request in the same way as a typical read request.

In accordance with the present disclosure, there are provided a storage device and a method of operating the storage device, which process an unmap request.

While embodiments of the present disclosure have been disclosed, those skilled in the art will appreciate that various modifications, additions and substitutions are possible, without departing from the scope and spirit of the present disclosure. Therefore, the scope of the present disclosure is defined by the appended claims and equivalents of the claims rather than by the description preceding them.

In the above-discussed embodiments, steps may be selectively performed or skipped. In addition, the steps in each embodiment may be performed in different orders than disclosed herein. More generally, the disclosed embodiments aim to help those skilled in this art more clearly understand the present disclosure rather than to limit the bounds of the present disclosure.

Embodiments of the present disclosure have been described with reference to the accompanying drawings. Specific terms or words used in the description should be construed in accordance with the spirit of the present disclosure without limiting the subject matter thereof. It should be understood that many variations and modifications of the basic Inventive concept described herein still fall within the spirit and scope of the present disclosure as defined in the appended claims and their equivalents.

What is claimed is:

1. A method of operating a memory controller, comprising:
   receiving an unmap request for requesting deletion of address mapping information for an unmap address from a host;
   storing the unmap address and prestored unmap-pattern data in a random access memory (RAM); and
   outputting the unmap-pattern data to the host in response to a read request for the unmap address being inputted.

2. The method according to claim 1, wherein the random access memory is a static random access memory (SRAM).

3. The method according to claim 1, wherein the unmap-pattern data has different pieces of pattern data depending on a communication Interface between the memory controller and the host.

4. The method according to claim 1, wherein the unmap-pattern data is prestored in the random access memory.

5. The method according to claim 1, wherein the random access memory stores a flag indicating that the unmap request for the unmap address has been inputted.

6. A method of operating a memory controller, the memory controller including a write cache buffer that individually stores write addresses in inputted write requests and unmap addresses in inputted unmap requests in an input order of the addresses, the method comprising:
   receiving a read request from a host; and
   outputting unmap-pattern data stored in the write cache buffer to the host when a logical block address in the read request is identical to any of the unmap addresses,
   wherein the unmap-pattern data is stored together with the unmap address in response to the unmap request.

7. A memory controller, comprising:
   a write cache buffer configured to temporarily store a write address and write data that are included in a write request inputted from a host; and
   a controller configured to, in response to an unmap request for requesting deletion of address mapping information for an unmap address from the host, store the unmap address and prestored unmap-pattern data in the write cache buffer.

8. The memory controller according to claim 7, wherein the write cache buffer is a random access memory (RAM).

9. The memory controller according to claim 7, wherein the unmap-pattern data has different pieces of pattern data depending on a communication interface between the memory controller and the host.

10. The memory controller according to claim 7, wherein the unmap-pattern data is prestored in a memory device controlled by the memory controller.

11. The memory controller according to claim 7, wherein the write cache buffer stores a flag indicating that an unmap request for the unmap address has been inputted.

* * * * *